US006046681A

United States Patent [19]

Solop

[11] Patent Number: 6,046,681
[45] Date of Patent: Apr. 4, 2000

[54] REMOTE CONTROLLED DOOR LOCK SYSTEM

[76] Inventor: John Solop, 2296 Chestnut Ave., Ronkonkoma, N.Y. 11779

[21] Appl. No.: 08/966,287

[22] Filed: Nov. 7, 1997

[51] Int. Cl.[7] .................... G06F 7/04

[52] U.S. Cl. .................... 340/825.31; 70/277; 70/280; 375/352; 361/172

[58] Field of Search .................... 340/825.31, 825.54, 340/825.3, 505; 361/172, 171, 160, 170, 139, 191, 206; 375/352; 380/23, 46; 70/277, 280, 100, 124, 91, 101, 141, 256, 257, 262, 263, 271, 443; 1/1

[56] References Cited

U.S. PATENT DOCUMENTS

| | | | |
|---|---|---|---|
| 3,906,447 | 9/1975 | Crafton | 340/825.31 X |
| 3,926,021 | 12/1975 | Genest et al. | 70/280 X |
| 4,206,450 | 6/1980 | Harden et al. | 340/521 |
| 4,509,093 | 4/1985 | Stellberger | 361/172 |
| 4,525,805 | 7/1985 | Prosan et al. | 340/825.31 |
| 4,870,400 | 9/1989 | Downs et al. | 340/825.31 |
| 5,061,923 | 10/1991 | Miller et al. | 340/825.31 |

*Primary Examiner*—Michael Horabik
*Assistant Examiner*—Anthony A. Asongwed

[57] ABSTRACT

A Remote Controlled Door Lock System for securely retracting a locking bolt from engagement to a striker plate disposed in a door jamb. The inventive device includes a solenoid for retracting the lock bolt from engagement to the striker plate, a first microcontroller and associated circuitry for generating and transmitting a first signal representing an access code, receiving and decoding a second signal representing a random value and generating and transmitting a third signal representing a unique alteration of the random value, and a second microcontroller and associated circuitry for receiving and decoding the first and third signals, generating and transmitting the second signal and for generating a fourth signal operable to energize the solenoid.

17 Claims, 2 Drawing Sheets

REMOTE CONTROLLED DOOR LOCK SYSTEM

BACKGROUND OF THE INVENTION

1. Field of the Invention

The present invention relates to door lock systems and more particularly pertains to a new Remote Controlled Door Lock System for securely retracting a standard lock set locking bolt from engagement to a striker plate disposed in a door jamb.

2. Description of the Prior Art

The use of door lock systems is known in the prior art. More specifically, door lock systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art door lock systems include U.S. Pat. No. 4,907,429; U.S. Pat. No. 5,177,988; U.S. Pat. No. 5,029,912; U.S. Pat. No. 5,003,800; U.S. Pat. No. 4,005,885 and U.S. Pat. No. 5,406,274.

While these devices fulfill their respective, particular objectives and requirements, the aforementioned patents do not disclose a new Remote Controlled Door Lock System. The inventive device includes a means for retracting the lock bolt from engagement to the striker plate. a means for generating and transmitting a first signal representing an access code, receiving and decoding a second signal representing a random value and generating and transmitting a third signal representing a unique alteration of the random value, and a means for receiving and decoding the first and third signals, generating and transmitting the second signal and for generating a fourth signal operable to energize the means for retracting the lock bolt from the striker plate, the fourth signal being generated only if the altered random value matches identically a similarly altered value as more fully described hereinbelow.

In these respects, the Remote Controlled Door Lock System according to the present invention substantially departs from the conventional concepts and designs of the prior art, and in so doing provides an apparatus primarily developed for the purpose of securely retracting a locking bolt from engagement to a striker plate disposed in a door jamb.

SUMMARY OF THE INVENTION

In view of the foregoing disadvantages inherent in the known types of door lock systems now present in the prior art, the present invention provides a new Remote Controlled Door Lock System construction wherein the same can be utilized for securely retracting a locking bolt from engagement to a striker plate disposed in a door jamb.

The general purpose of the present invention, which will be described subsequently in greater detail, is to provide a new Remote Controlled Door Lock System apparatus and method which has many of the advantages of the door lock systems mentioned heretofore and many novel features that result in a new Remote Controlled Door Lock System which is not anticipated, rendered obvious, suggested, or even implied by any of the prior art door lock systems, either alone or in any combination thereof.

To attain this, the present invention generally comprises a means for retracting the lock bolt from engagement to the striker plate, a means for generating and transmitting the first signal representing an access code, receiving and decoding the second signal representing a random value and generating and transmitting the third signal representing a unique alteration of the random value, and a means for receiving and decoding the first and third signals, generating and transmitting the second signal and for generating the fourth signal operable to energize the means for retracting the lock bolt from the striker plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Remote Controlled Door Lock System apparatus and method which has many of the advantages of the door lock systems mentioned heretofore and many novel features that result in a new Remote Controlled Door Lock System which is not anticipated, rendered obvious, suggested, or even implied by any of the prior art door lock systems, either alone or in any combination thereof.

It is another object of the present invention to provide a new Remote Controlled Door Lock System which may be easily and efficiently manufactured and marketed.

It is a further object of the present invention to provide a new Remote Controlled Door Lock System which is of a durable and reliable construction.

An even further object of the present invention is to provide a new Remote Controlled Door Lock System which is susceptible of a low cost of manufacture with regard to both materials and labor, and which accordingly is then susceptible of low prices of sale to the consuming public, thereby making such Remote Controlled Door Lock System economically available to the buying public.

Still yet another object of the present invention is to provide a new Remote Controlled Door Lock System which provides in the apparatuses and methods of the prior art some of the advantages thereof, while simultaneously overcoming some of the disadvantages normally associated therewith.

Still another object of the present invention is to provide a new Remote Controlled Door Lock System for securely retracting a locking bolt from engagement to a striker plate disposed in a door jamb.

Yet another object of the present invention is to provide a new Remote Controlled Door Lock System which includes a means for retracting the lock bolt from engagement to the striker plate, a means for generating and transmitting the first signal representing an access code, receiving and decoding the second signal representing a random value and generating and transmitting the third signal representing a unique alteration of the random value, and a means for receiving and decoding the first and third signals, generating and transmitting the second signal and for generating the fourth signal operable to energize the means for retracting the lock bolt from the striker plate.

Still yet another object of the present invention is to provide a new Remote Controlled Door Lock System that utilizes a digital encryption system having a key code to alter the value of the random value.

Yet another object of the present invention is to provide a new Remote Controlled Door Lock System wherein the means for generating and transmitting the first signal representing an access code, receiving and decoding the second signal representing a random value and generating and transmitting the third signal representing a unique alteration of the random value is disposed in a remote unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
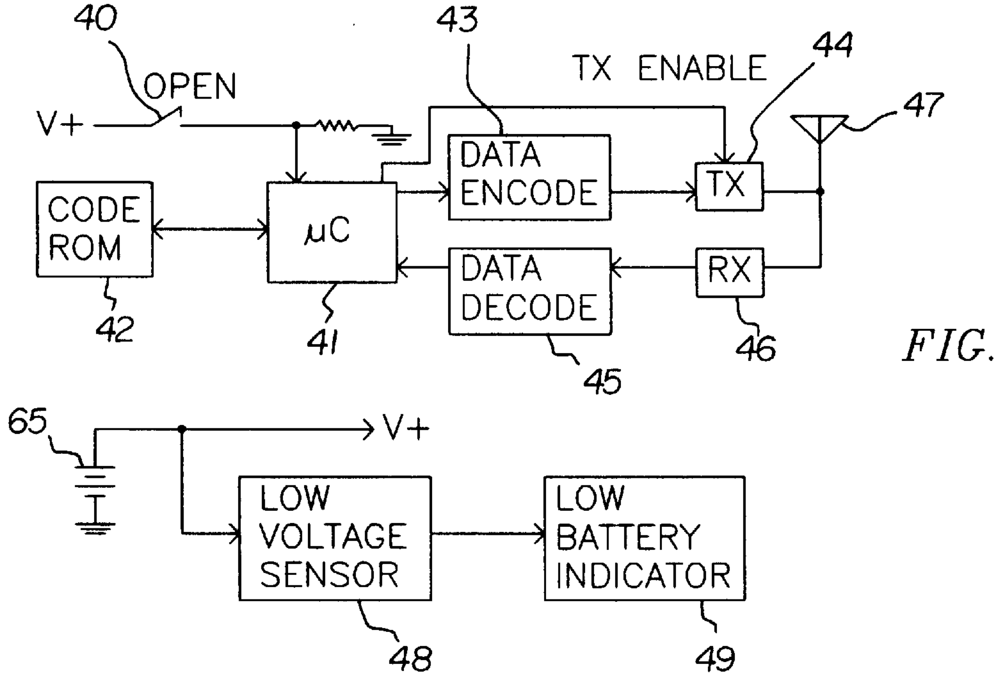
FIG. 1 is a schematic view of the circuitry of the remote unit of the new Remote Controlled Door Lock System according to the present invention.

With reference now to the drawings, and in particular to FIGS. 1 through 4 thereof, a new Remote Controlled Door Lock System embodying the principles and concepts of the present invention and generally designated by the reference numeral 10 will be described.

More specifically, it will be noted that the Remote Controlled Door Lock System 10 comprises a spring-biased solenoid 30 having a core (not shown) fixedly attached to the lock bolt 17 through connecting means 32. A first microcontroller 41 is operably coupled to a first data encoder 43, a first data decoder 45, and a first read only memory device 42 containing data representing a code key. The first data encoder 43 is operably coupled to a first transmitter 44 and the first data decoder 45 is operably coupled to a first receiver 46. The first transmitter 44 and the first receiver 46 are operably coupled to a first antenna 47.

A second microcontroller 50 is operably coupled to a second data encoder 52, a second data decoder 56, and a second read only memory device 51 containing data representing the same code key as that contained in the first read only memory device 42. The second data encoder 52 is operably coupled to a second transmitter 53 and the second data decoder 56 is operably coupled to a second receiver 55. The second transmitter 53 and the second receiver 55 are operably coupled to a second antenna 54.

With reference to FIG. 1 the circuitry contained in the remote unit remote from a door 11 (FIG. 4) is shown. A first signal representing the access code is generated by the first microcontroller 41 and encoded by the first data encoder 43 upon the closing of a switch 40. The first transmitter 44 is then enabled and transmits the first signal. The circuitry shown in FIG. 2, hereinafter referred to as the control circuitry, is disposed within an enclosure 22 (FIG. 4) adjacent a standard lock set housing 12 (FIG. 3). If the remote unit is sufficiently close to the enclosure 22, the first signal is received by the second receiver 55 and decoded by the second data decoder 56.

The decoded first signal is compared with the programmed code stored in the second microcontroller 50 and if they are the same the second signal representing a random value, which in the preferred embodiment is a 32 bit value, is generated and encoded for transmission by the second data encoder 52. The second transmitter 53 is enabled and transmits the second signal.

The second signal is received by the first receiver 46 and decoded by the first data decoder 45. The first microcontroller 41 alters the random value by applying an algorithm, which in the preferred embodiment is a digital encryption system utilizing the data in the first read only memory device 42 as a code key, and generates a first altered random value. The first altered random value is then encoded into the third signal for transmission by the first data encoder 43, the first transmitter 44 is enabled and the third signal is transmitted.

The third signal is received by the second receiver 55 and decoded by the second decoder 56. The second microcontroller 50 compares the first altered random value to a second altered random value similarly generated by the second microcontroller 50. If the first altered random value equals the second altered random value, the fourth signal is generated by the second microcontroller 50. The fourth signal is operable to energize a solenoid driver circuit 57 which in turn energizes the solenoid 30 for a few seconds retracting the lock bolt 17 from the striker plate 19 and thereby allowing the door 11 to open.

Also shown in FIG. 1 is a first low voltage sensor circuit 48 operably coupled to a first battery 65, the first battery 65 powering the first microcontroller 41 and associated circuitry. The first low voltage sensor circuit 48 is operable to energize a first indicator 49, such as an LED, when the first battery voltage drops below a first pre-determined voltage.

Figure 2:
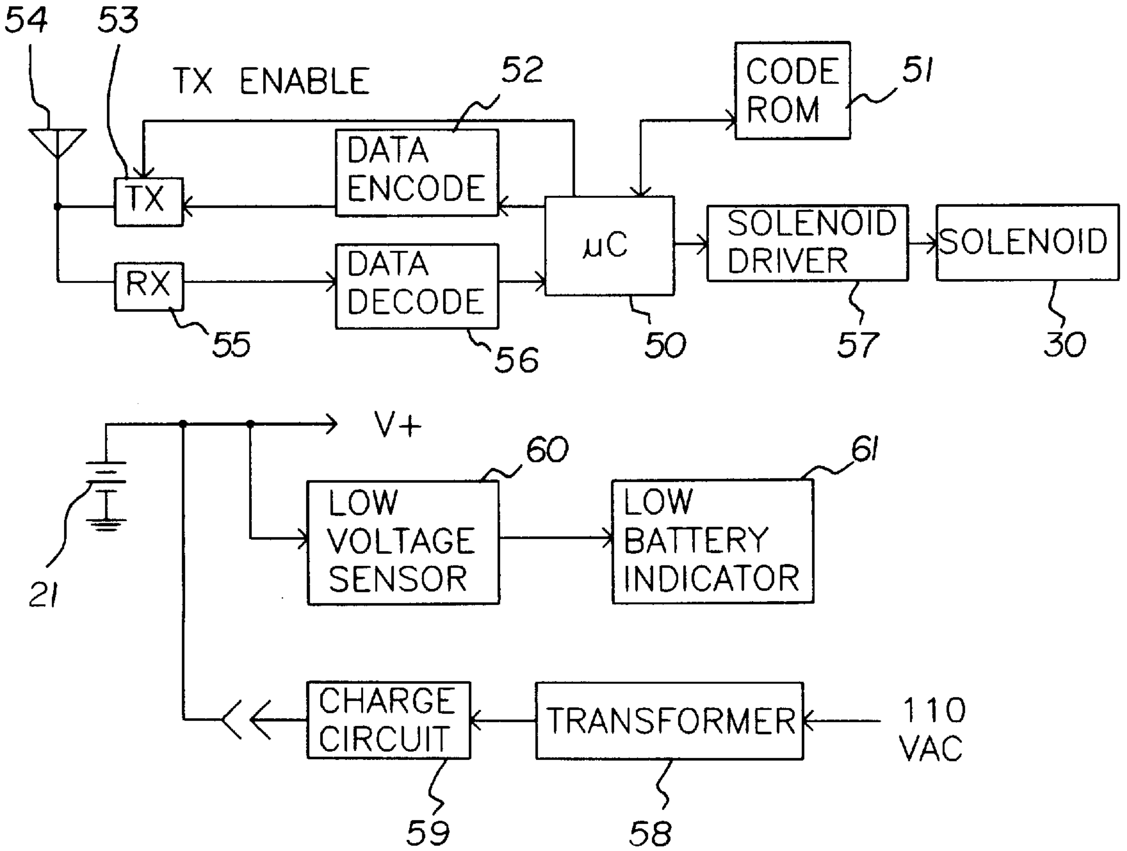
FIG. 2 is a schematic view of the control circuitry thereof.
Figure 3:
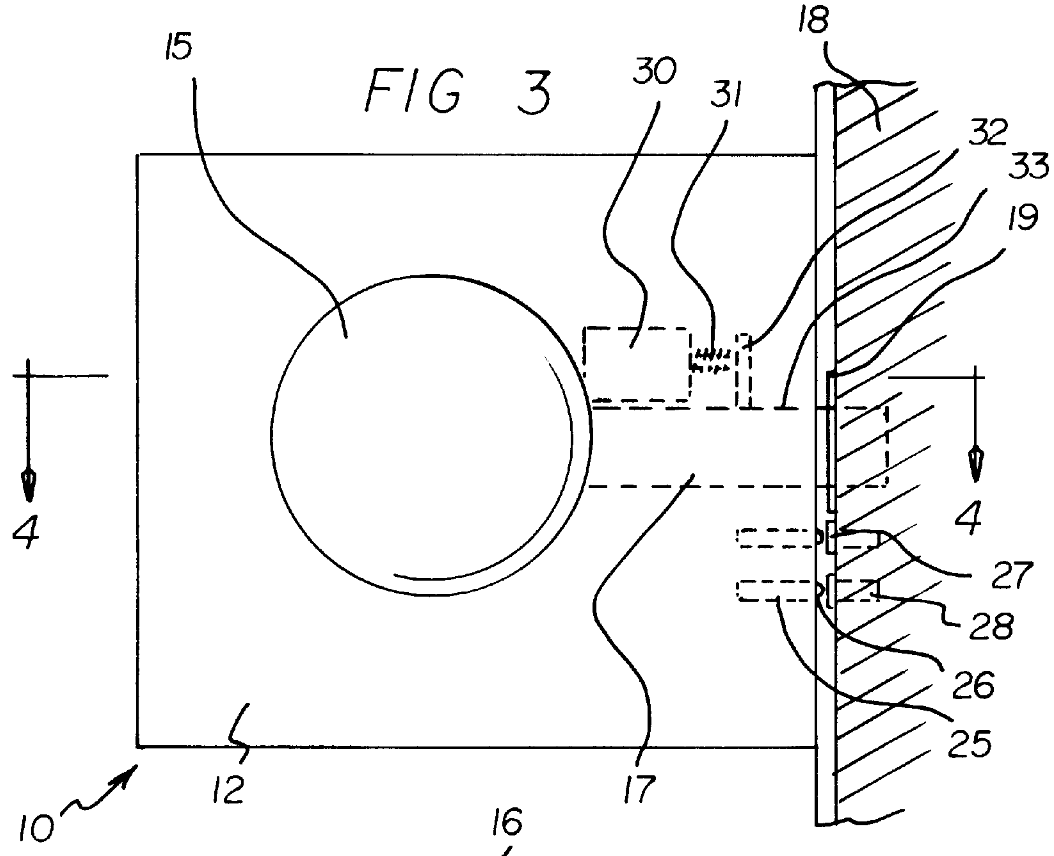
FIG. 3 is a right side elevation view of the invention.

A circuit having a similar function is also shown in FIG. 2 for use with a second battery 21, the second battery 21 powering the second microcontroller 50 and associated circuitry. The second low voltage sensor circuit 60, shown operably coupled to the second battery 21, is operable to energize a second indicator 49, such as an LED, when the second battery voltage drops below a second pre-determined voltage.

In the preferred embodiment, the second battery 21 is a NiCd rechargeable battery and a means for recharging the second battery 21 is shown in FIG. 2. A transformer 58 is shown operably coupled to a charging circuit 59 which in turn is operably coupled to the second battery 21. The transformer 58 and charging circuit 59 are preferably disposed in a location remote from the lock set housing 12 while the second battery 21 is preferably disposed in a housing 20 adjacent the lock set housing 12. The charging circuit 59 is shown coupled to the second battery 21 by means of brushes 25 and contact points 27 which contact each other when the door 11 is in a closed position (FIG. 3).

Figure 4:
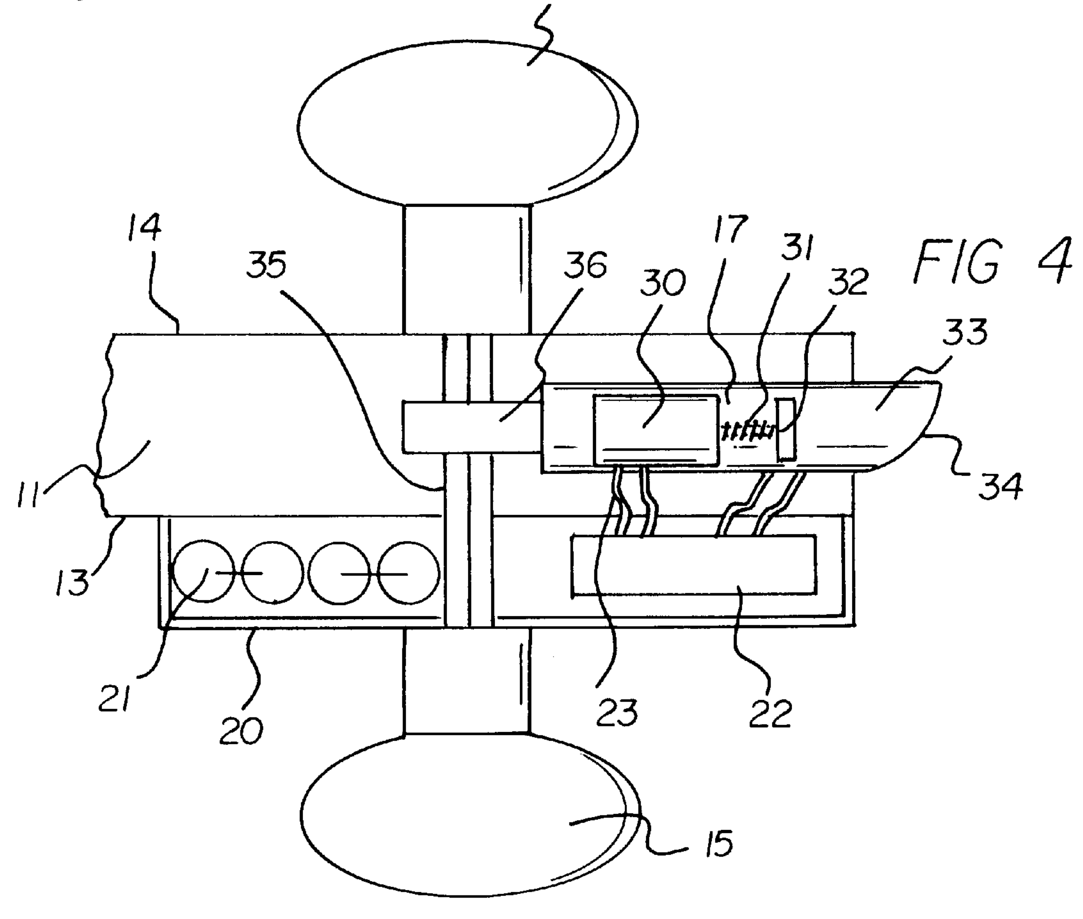
FIG. 4 is a top plan view of the invention.

With reference to FIGS. 3 and 4 a standard lock set including a lock bolt 17, striker plate 19, inside and outside door knobs 15 and 16, spindle 35 and linkage means 36 is shown disposed in a lock set housing 12. The lock bolt 17 is shown having a camming surface 34 for engagement with the striker plate 19. The solenoid 30 is shown mounted in the lock set housing 12 and biased by a spring 31 which maintains the lock bolt 17 in engagement with the striker plate 19. A means for connecting the solenoid core to an upper surface 33 of the lock bolt 17 is shown including a connecting member 32 fixedly attached to the upper surface 33 as by welding.

With reference to FIG. 4 the housing 20 is shown disposed on an inside surface 13 of the door 11. The second battery 21 and control circuit enclosure 22 are shown disposed within the housing 20. A pair of connecting wires 23 are shown for connecting the solenoid driver circuit 57 to the solenoid 30. Also shown are a pair of connecting wires 24 which terminate at the brushes 26 which are shown disposed in apertures 25.

In use, the switch 40 of the remote unit is closed sending the access code to the control circuitry. If the access code matches the programmed code, the control circuitry transmits the second signal representative of the random value. The remote unit receives the second signal and generates the first altered random value which is transmitted as the third signal. If the first altered random value is equal to the is second altered random value, the fourth signal is generated energizing the solenoid 30 and retracting the lock bolt 17 from the striker plate 19.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Remote Controlled Door Lock system for use with a door having a standard lock set including a lock bolt engageable to a striker plate in a door jamb comprising:

a means for retracting the lock bolt from engagement to the striker plate;

a means for generating and transmitting a first signal, receiving and decoding a second signal and generating and transmitting a third signal;

a means for receiving and decoding the first and third signals, generating and transmitting the second signal and for generating a fourth signal, the means for receiving and decoding the first and third signals, generating and transmitting the second signal and for generating the fourth signal being operably coupled to the means for retracting the lock bolt from engagement to the striker plate and to a rechargeable battery, the rechargeable battery being operably coupled to a second voltage sensor, the second voltage sensor operable to energize a second indicator when the rechargeable battery voltage drops below a second predetermined voltage; and wherein the rechargeable battery is operably coupled to a recharging circuit operably coupled to a transformer, the recharging circuit being operably coupled to the rechargeable battery by means of a pair of brushes operably coupled to the rechargeable battery and disposed in the door, the brushes contactable with a pair of contacts operably coupled to the recharging circuit, the contacts being disposed in the door jamb.

2. The Remote Controlled Door Lock System of claim 1, wherein the means for generating and transmitting the first signal, receiving and decoding the second signal and generating and transmitting the third signal further comprise a first microcontroller operably coupled to a first data encoder, a first data decoder, and a first read only memory device, the first data encoder being operably coupled to a first transmitter and the first data decoder being operably coupled to a first receiver, the first transmitter and the first receiver being operably coupled to a first antenna.

3. The Remote Controlled Door Lock System of claim 2, wherein the means for receiving and decoding the first and third signals, generating and transmitting the second signal and for generating the fourth signal further comprise a second microcontroller operably coupled to a second data encoder, a second data decoder, and a second read only memory device, the second data encoder being operably coupled to a second transmitter and the second data decoder being operably coupled to a second receiver, the second transmitter and the second receiver being operably coupled to a second antenna.

4. The Remote Controlled Door Lock System of claim 3, wherein the first signal represents an access code and the second signal represents a random value.

5. The Remote Controlled Door Lock System of claim 4, wherein the first microcontroller further comprises a means for altering the random value based upon an algorithm using the data in the first read only memory device and generating a first altered random value, the first altered random value being represented by the third signal.

6. The Remote Controlled Door Lock System of claim 5, wherein the second microcontroller further comprises a means for altering the random value based upon the algorithm using the data in the second read only memory device and generating a second altered random value, the data in the second read only memory device being the same as the data in the first read only memory device, and wherein the second microcontroller further comprises a means for comparing the first altered random value to the second altered random value, the fourth signal being generated in the event the first altered random value is equal to the second altered random value.

7. The Remote Controlled Door Lock System of claim 6, wherein the means for retracting the lock bolt from engagement to the striker plate further comprise a solenoid having a core fixedly attached to the lock bolt, the solenoid being operably coupled to a solenoid driver circuit responsive to the fourth signal.

8. The Remote Controlled Door Lock System of claim 1, wherein the means for generating and transmitting the first signal, receiving and decoding the second signal and generating and transmitting the third signal is powered by a first battery, the first battery being operably coupled to a first voltage sensor, the first voltage sensor operable to energize a first indicator when the first battery voltage drops below a first pre-determined voltage.

9. The Remote Controlled Door Lock System of claim 1, wherein the means for receiving and decoding the first and third signals, generating and transmitting the second signal and for generating the fourth signal is powered by a second battery, the second battery being operably coupled to a second voltage sensor, the second voltage sensor operable to energize a second indicator when the second battery voltage drops below a second pre-determined voltage.

10. The Remote Controlled Door Lock System of claim 9, wherein the second battery is a rechargeable battery.

11. The Remote Controlled Door Lock System of claim 10 further comprising a means for recharging the second battery.

12. The Remote Controlled Door Lock System of claim 11, wherein the means for recharging the second battery further comprise a transformer operably coupled to a recharging circuit, the recharging circuit being operably coupled to the second battery.

13. The Remote Controlled Door Lock System of claim 2, wherein the first transmitter is further operably coupled to the first microcontroller.

14. The Remote Controlled Door Lock System of claim 3, wherein the second transmitter is further operably coupled to the second microcontroller.

15. The Remote Controlled Door Lock System of claim 1, wherein the means for generating and transmitting the first signal, receiving and decoding the second signal and generating and transmitting the third signal is disposed within an enclosure adjacent the standard lock set.

16. The Remote Controlled Door Lock System of claim 6, wherein the algorithm further comprises a digital encryption system algorithm.

17. The Remote Controlled Door Lock System of claim 4, wherein the second microcontroller further comprises a means for comparing the access code to a programmed code.

* * * * *